(12) United States Patent
Kim

(10) Patent No.: US 8,286,205 B2
(45) Date of Patent: Oct. 9, 2012

(54) TERMINAL AND METHOD FOR PROVIDING BROADCAST INFORMATION

(75) Inventor: Mi Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 11/779,179

(22) Filed: Jul. 17, 2007

(65) Prior Publication Data

US 2008/0222690 A1     Sep. 11, 2008

(30) Foreign Application Priority Data

Mar. 8, 2007 (KR) ........................ 10-2007-0023113

(51) Int. Cl.
*G06F 3/00* (2006.01)
*G06F 13/00* (2006.01)
*H04N 5/445* (2011.01)

(52) U.S. Cl. ............... 725/38; 725/39; 725/40; 725/41; 725/43; 715/716; 715/717; 715/718; 715/719; 715/769; 715/810

(58) Field of Classification Search ............. 725/37–61; 715/716–719, 769, 784–786, 810, 825, 835
See application file for complete search history.

(56) References Cited

U.S. PATENT DOCUMENTS

| | | | |
|---|---|---|---|
| 5,850,218 A * | 12/1998 | LaJoie et al. ................... 725/45 |
| 6,526,577 B1 | 2/2003 | Knudson et al. | |
| 6,631,523 B1 * | 10/2003 | Matthews et al. ............... 725/53 |
| 7,336,787 B2 * | 2/2008 | Unger et al. ..................... 725/87 |
| 7,344,084 B2 * | 3/2008 | DaCosta .......................... 725/39 |
| 2003/0005447 A1 | 1/2003 | Rodriguez | |
| 2004/0088727 A1 * | 5/2004 | Kamiya ........................... 725/52 |
| 2004/0132512 A1 * | 7/2004 | Yajima ....................... 455/575.3 |
| 2004/0139465 A1 | 7/2004 | Matthews, III et al. | |
| 2006/0101498 A1 * | 5/2006 | Arling et al. .................... 725/81 |
| 2006/0212906 A1 | 9/2006 | Cantalini | |
| 2006/0259864 A1 | 11/2006 | Klein et al. | |
| 2009/0113478 A1 * | 4/2009 | Haughawout et al. .......... 725/40 |
| 2009/0282440 A1 * | 11/2009 | Rodriguez ...................... 725/60 |

FOREIGN PATENT DOCUMENTS

| | | |
|---|---|---|
| CN | 1798320 | 7/2006 |
| EP | 0 697 789 A | 2/1996 |
| EP | 0921689 | 6/1999 |
| EP | 0964575 | 12/1999 |
| EP | 1 001 628 A1 | 5/2000 |
| EP | 1 708 498 A2 | 10/2006 |
| JP | 2003-087673 | 3/2003 |
| WO | WO 00/05892 | 2/2000 |
| WO | WO 00/59212 | 10/2000 |

\* cited by examiner

*Primary Examiner* — Brian Pendleton
*Assistant Examiner* — Nnenna Ekpo
(74) *Attorney, Agent, or Firm* — Lee, Hong, Degerman, Kang & Waimey

(57) ABSTRACT

A terminal displays a broadcast program from a first provider, and displays one or more identifiers from additional broadcast providers. Upon selection of one of the identifiers of the additional providers, additional information of broadcasts from the additional provider is also displayed thereby enabling a user to decide whether to continue to display the broadcast program from the first provider or to display a broadcast program from the additional provider.

26 Claims, 9 Drawing Sheets

TERMINAL AND METHOD FOR PROVIDING BROADCAST INFORMATION

CROSS REFERENCE TO RELATED APPLICATION

Pursuant to 35 U.S.C. §119(a), this application claims the benefit of earlier filing date and right of priority of Korean Patent Application No. 10-2007-0023113, filed on Mar. 8, 2007, the contents of which are hereby incorporated by herein in their entirety.

FIELD OF THE INVENTION

The present invention relates to a terminal and method for providing a program list while receiving and displaying a broadcast program or program data, and more particularly wherein the program list comprises provider logos and/or channel logos which respectively identify various providers and channels available for selection.

DISCUSSION OF THE RELATED ART

A conventional terminal can receive and display a broadcast program or data, but cannot provide broadcast information regarding other broadcast providers simultaneously while displaying the broadcast program.

For this reason, where a user desires to change a broadcast provider providing the current broadcast program to a different broadcast provider, the user has the trouble of having to carry out unnecessary key operations to select different broadcast providers because there is no broadcast information regarding the different broadcast providers.

SUMMARY OF THE INVENTION

One aspect of the invention is a method for providing a program list on a mobile terminal operable within a wireless communication system, the method includes receiving program data from a wireless transmitting entity, displaying the received program data on a display associated with the mobile terminal, and displaying the program list on a region of the display simultaneously while displaying the received program data, wherein the program list comprises provider logos and/or channel logos which respectively identify various providers and channels available for selecting. The list may be displayed responsive to a user's input and may be displayed according to predetermined criteria including a particular order according to audience rating, user preference according to a predetermined indication of desired channels, program content type, or a user designation which identifies a subset of all available channels.

The user may provide input to identify one of the providers or channels of the program list and display additional information associated with the identified one of the providers or channels.

The provider logos and channel logos individually comprise either a graphic or an image. A channel logo is displayed for each of the plurality of channels, and the provider logos and channel logos may be displayed according to predetermined criteria. The provider and or channel logos may be received from a broadcast channel, a data broadcast channel, or a wireless communication, and may be stored at the mobile terminal.

The program list may be displayed as a two-dimensional array or as a scrollable list. The list may be displayed as an overlay to the received program data, or may be displayed simultaneously in a region of the display separate than the display of the program data.

An additional aspect of the method for providing a program list on a mobile terminal includes detecting sliding user contact on the display, wherein the sliding user contact is from a first region of the display to a second region of the display and wherein the first region is associated with one of the channel logos and the second region is within a predetermined region of the display, identifying a desired channel to display on the display based upon which of the channel logos is associated with the first region, and changing program data which is displayed on the display to program data which is associated with the desired channel.

The user may select one of the providers and display a list of the channels from the selected provider, and from the list of channels, receive program data from a selected channel.

Another aspect of the invention is a terminal having a receiver for receiving program data from a wireless transmitting entity, an input component permitting user input, a display for displaying the received program data, and a controller for operating responsive to instructions to provide a program list, wherein the controller is configured to display the program list on a region of the display simultaneously with the displaying of the received program data, wherein the program list comprises provider logos and/or channel logos which respectively identify various providers and channels available for selecting. The program list may be displayed as a scrollable list.

An additional aspect of the terminal is wherein the controller is further configured to detect sliding user contact on the display, wherein the sliding user contact is from a first region of the display to a second region of the display and wherein the first region is associated with one of the channel logos and the second region is within a predetermined region of the display, to identify a desired channel to display on the display based upon which of the channel logos is associated with the first region, and to change program data which is displayed on the display to program data which is associated with the desired channel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Figure 1:
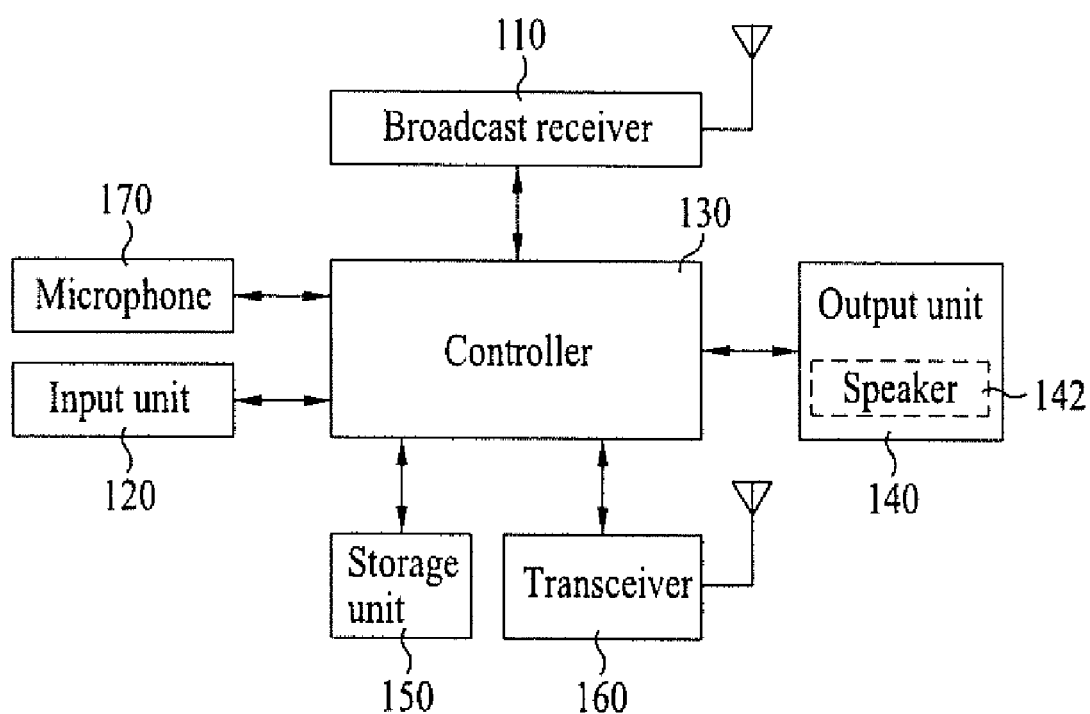
FIG. 1 is a block diagram of a terminal providing broadcast information according to an embodiment of the present invention.

A terminal providing a broadcast program or program data according embodiments of to the present invention will hereinafter be described in detail with reference to FIG. 1. The terminal comprises a broadcast receiver 110, an input unit 120, a controller 130, an output unit 140, a storage unit 150, a transceiver 160, and a microphone 170. The output unit 140 includes a speaker 142 as an audio output device.

The broadcast receiver 110 receives a broadcast program provided from a broadcast provider. The broadcast provider is a service that provides a broadcast program to at least one terminal belonging to a broadcast network over at least one broadcast channel.

For example, the broadcast program may be provided to the terminal by various digital broadcasting systems. These digital broadcasting systems may include a Terrestrial Digital Multimedia Broadcasting (T-DMB) system, a Satellite Digital Multimedia Broadcasting (S-DMB) system, a Digital Video Broadcast-Handheld (DVB-H) system, a Media content distribution system Forward Link Only (MediaFLO) system, and an Integrated Services Digital Broadcasting-Terrestrial (ISDB-T) system. Of course, because the broadcast program can be transmitted to the terminal by all systems transmitting broadcast programs, the present invention is not limited to the above-mentioned systems.

The broadcast receiver 110 also receives data related to a broadcast program ("broadcast-related data") from each broadcast provider from an external broadcast management service. For example, the broadcast receiver 110 may receive the broadcast-related data periodically or randomly.

The broadcast management service is a service that generates or manages the broadcast-related data. In particular, the broadcast management service may be provided by the broadcast provider.

For example, the broadcast-related data may be provided using an electronic program guide (EPG) in a DMB system or an electronic service guide (ESG) in a DVB-H system. Of course, because the broadcast-related data can be provided using various programs for provision of broadcast-related data, the embodiments of present invention are not limited to the above-mentioned EPG or ESG.

The input unit 120 receives an input from a user of the terminal and generates a signal corresponding to the received input. The input unit 120 may be a key pad, a touch pad, or a touch screen as a means for receiving the user's input. In more detail, the input unit 120 may include a lottery key, scroll key, jog shuttle or jog dial for receiving a desired direction input from the user.

The controller 130 controls the entire operation of the terminal. The controller 130 also controls all constituent elements of the terminal such that they can be operated.

The output unit 140 displays various information associated with the terminal. In particular, the output unit 140 provides video data to a video output device (not shown) and audio data to an audio output device such as the speaker 142.

By way of illustration, in the following example, a second broadcast provider is selected using the input unit 120 while a broadcast program provided by a first broadcast provider is displayed on the output unit 140.

First, the controller 130 controls the output unit 140 in response to a input signal to display one or more identifiers of one or more selectable broadcast providers while displaying the broadcast program provided by the first broadcast provider. The one or more identifiers enable the broadcast providers to be identified.

Each identifier is a logo image including at least one of a graphic image, a symbol image, and an icon image indicative of a corresponding broadcast provider.

Information regarding each identifier may be included in broadcast data constituting a broadcast program, included in broadcast-related data, or transmitted to the terminal in a broadcast provider or broadcast channel search process. Alternatively, the identifier information may be pre-stored in the terminal.

The identifiers are displayed in corresponding areas formed on a bar provided at a portion of the screen of the terminal. Then, when an identifier of the second broadcast provider is selected from the displayed identifiers, the controller 130 controls the output unit 140 to display broadcast information regarding a broadcast program provided from the second broadcast provider while displaying the broadcast program provided from the first broadcast provider.

The broadcast information may be included in the broadcast-related data received by the broadcast receiver 110, or this information may be the broadcast program itself provided by the second broadcast provider.

The process of displaying the broadcast information through the output unit 140 will be described later in more detail with reference to FIGS. 3A to 4C. As an alternative, when the identifier indicative of the second broadcast provider is selected from the displayed one or more identifiers, the controller 130 may control the output unit 140 to stop displaying the broadcast program provided from the first broadcast provider and display the broadcast program ("second broadcast program") provided from the second broadcast provider.

The process of displaying the second broadcast program through the output unit 140 will be described later in more detail with reference to FIGS. 5A and 5B. The storage unit 150 stores data transmitted to and from the terminal and all programs necessary for the operation of the terminal. In particular, the storage unit 150 stores the broadcast information included in the broadcast-related data.

Broadcast information is information regarding a broadcast program currently provided or a broadcast program to be provided later. The broadcast information includes at least one of a broadcast program title, viewable age information, pay/free view information, broadcast synopsis information, content type, broadcast highlight information, and broadcast time information with respect to one broadcast program. Bbroadcast information, when one or more broadcast channels are allocated to the corresponding broadcast provider, is information regarding each of the one or more broadcast channels.

The storage unit 150 also stores information about at least one of an audience rating, a preference and a user designation/non-designation with respect to at least one of a broadcast provider, the content type of a broadcast program such as news, sports, or drama, a broadcast channel allocated to a broadcast provider and a broadcast program provided over a specific broadcast channel.

Figure 2:
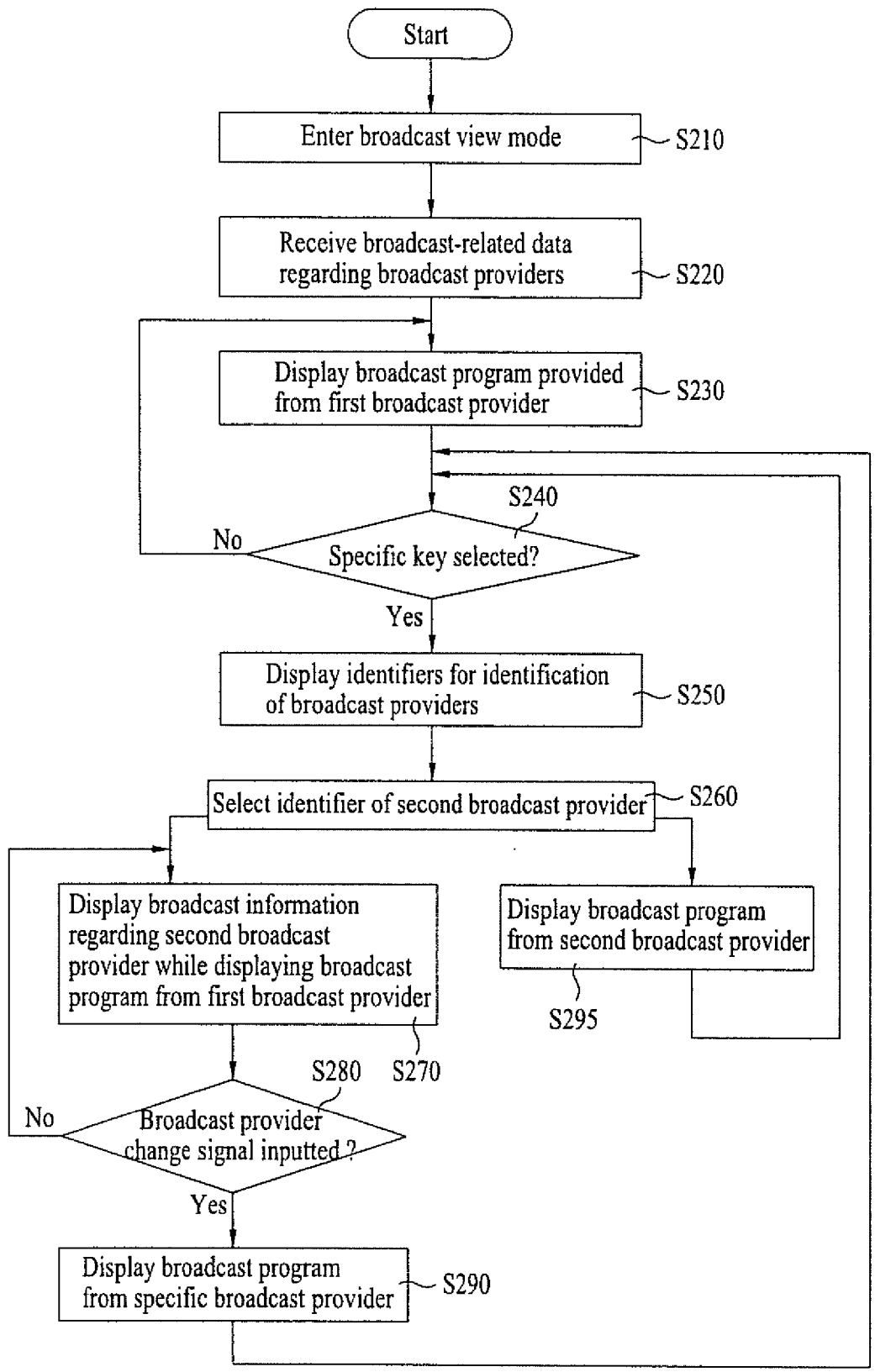
FIG. 2 is a flowchart illustrating an embodiment of a process of providing broadcast information in the terminal according to the present invention.

A process of providing broadcast information in the terminal according to an embodiment of the present invention will hereinafter be described in detail with reference to FIG. 2. The terminal enters a broadcast view mode according to the user's selection (S210). The terminal then receives broadcast-related data regarding one or more broadcast providers from the broadcast management service (S220).

The broadcast-related data includes broadcast information regarding each of the one or more broadcast providers, or broadcast information regarding each of the one or more broadcast channels allocated to each of the one or more broadcast providers.

The broadcast-related data includes information about one or more identifiers for enabling the user to identify the one or more broadcast providers (or the one or more broadcast channels).

The identifier information may be provided from the broadcast providers or broadcast management service to the terminal in a viewable broadcast provider (or broadcast channel) search process. Alternatively, each identifier information may be provided to the terminal under the condition of being included in broadcast data constituting a broadcast program provided from a corresponding broadcast provider, or be pre-stored in the terminal.

The receiving operation S220 may be performed periodically or randomly. Alternatively, the receiving operation S220 may be performed only when the provision of broadcast-related data is requested by the terminal.

The terminal determines whether a specific key has been selected (S240) while displaying the broadcast program provided by the first broadcast provider (S230). The specific key is a key for selecting a function of displaying one or more identifiers for enabling the user to identify one or more selectable broadcast providers, while a broadcast program provided from a certain broadcast provider is displayed.

If it is determined that the specific key has been selected, the terminal displays, on the screen, the one or more identifiers for enabling the user to identify the one or more broadcast providers (S250). Each identifier is a logo image including at least one of a graphic image, a symbol image, and an icon image indicative of a corresponding broadcast provider.

For example, the one or more identifiers may be displayed in corresponding areas formed on a bar or matrix provided on a portion of the screen.

Also, the display operation S250 may display one or more identifiers enabling the user to identify one or more broadcast channels allocated to each broadcast provider. The display operation S250 also may display the one or more identifiers while moving them in a predetermined direction. For example, the display operation S250 may display the one or more identifiers while moving them at a predetermined speed in the predetermined direction or while moving them in units of a predetermined number in the predetermined direction.

The display operation S250 also may display one or more identifiers indicative of one or more broadcast providers (or one or more broadcast channels) preselected based on predetermined criteria. Here, the predetermined criteria may include at least one of an audience rating, a preference and a user designation/non-designation with respect to at least one of a broadcast provider, the content type of a broadcast program such as news, sports, or drama, the suitability of program content for a particular age range, a broadcast channel allocated to a broadcast provider, and a broadcast program provided over a specific broadcast channel.

For example, the terminal may preselect a number of broadcast providers (or broadcast channels) from all broadcast providers (or all broadcast channels) used within a period of time in the order of descending audience ratings or preferences, and display only identifiers indicative of the preselected broadcast providers (or broadcast channels). Alternatively, the terminal may display only identifiers indicative of broadcast providers (or broadcast channels) designated by the user. At this time, the user may designate the broadcast providers (or broadcast channels) according to time zones, genres or pay/free broadcasts.

Also, the display operation S250 may distinguishably display specific identifiers among the displayed one or more identifiers according to at least one of a preference, an audience rating, the content type of a broadcast program, and a user designation/non-designation with respect to the one or more broadcast providers.

For example, the terminal may distinguishably display identifiers of a predetermined number of broadcast providers among the displayed one or more identifiers in the order of descending audience ratings or preferences. Alternatively, the terminal may distinguishably display identifiers of broadcast providers designated by the user among the displayed one or more identifiers. In particular, the terminal may distinguishably display specific identifiers using a highlight, a specific color, a specific pattern, etc.

Also, in order to inform the user that the expiration of a pay broadcast draws near when the pay broadcast is provided from a specific broadcast provider, or inform the user of a specific broadcast provider providing a broadcast program in which a specific person designated by the user appears, the terminal may distinguishably display an identifier of the specific broadcast provider.

The terminal selects an identifier ("second identifier") of the second broadcast provider from the displayed one or more identifiers in response to an input from the user (S260).

A description will be given of an operation of the terminal based on the selection of the second identifier under the condition that the terminal operation is roughly classified into two operations.

In the first operation, the terminal displays broadcast information regarding the second broadcast provider while displaying the broadcast program provided from the first broadcast provider (S270).

The terminal can display broadcast information corresponding to the selected identifier because it stores a broadcast provider corresponding to each identifier and broadcast information corresponding to each broadcast provider.

The terminal may together display broadcast information regarding the broadcast program provided from the first broadcast provider on a portion of the screen.

The broadcast information is broadcast information regarding a broadcast program currently or a broadcast program to be provided later. Also, the broadcast information, when one or more broadcast channels are allocated to the second broadcast provider, is broadcast information regarding a selected broadcast channel among the one or more broadcast channels. Also, the broadcast information includes at least one of a broadcast program title, viewable age information, pay/free view information, broadcast synopsis information, content type, broadcast highlight information, and broadcast time information with respect to an arbitrary broadcast program. Alternatively, the broadcast information may include at least one of video data and audio data constituting a broadcast program currently provided from the second broadcast provider.

The terminal, while performing the display operation S270, determines whether a broadcast provider change signal has been inputted (S280). Upon determining that the broadcast provider change signal has been provided, the terminal stops displaying the broadcast program provided from the first broadcast provider, and receives and displays a broadcast program provided from a specific broadcast provider corresponding to the broadcast provider change signal (S290).

In the second operation, the terminal stops displaying the broadcast program provided from the first broadcast provider, and receives and displays a broadcast program provided from the selected second broadcast provider (S295).

The terminal can receive a broadcast program provided from a broadcast provider allocated a channel frequency corresponding to the selected identifier because it stores a broadcast provider corresponding to each identifier and channel frequency information corresponding to each broadcast provider.

For example, the display operation S295 may display a broadcast program provided over a selected broadcast channel among one or more broadcast channels when the one or more broadcast channels are allocated to the second broadcast provider.

Figure 3A:
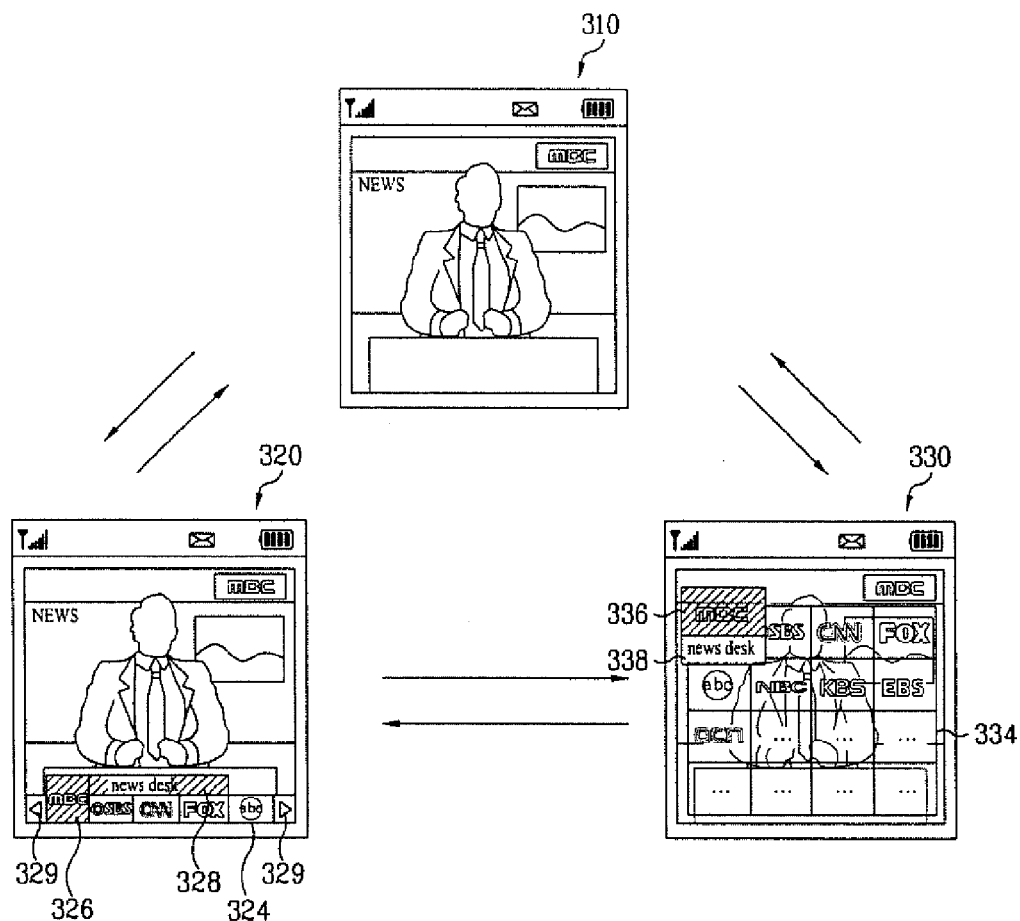
FIG. 3A is a state diagram illustrating a process of displaying identifiers of broadcast providers in the terminal according an embodiment of to the present invention.

A process of displaying identifiers in the terminal according to the present invention will be described in detail with reference to FIGS. 3A to 3D. FIG. 3A illustrates a process of displaying one or more identifiers enabling the user to identify one or more broadcast providers.

The terminal displays a broadcast program provided from one broadcast provider (310). When a key for selection of a broadcast provider identifier display function is provided, the terminal displays identifiers of one or more selectable broadcast providers on a bar 324 displayed at the bottom of the screen or on a matrix 334 displayed at the entire screen (320 or 330)

The bar 324 may be displayed at any portion of the screen, not limited to the bottom of the screen. Also, the terminal may display the one or more identifiers while the user moves them in a desired direction by activating keys 329 provided at both ends of the bar 324.

The matrix 334 may be set to vanish on the screen after the lapse of a period of time in order not to disturb the viewing of the currently displayed broadcast program. Also, the matrix 334 may be displayed in an overlay, Picture In Picture (PIP) or pop-up window fashion.

Further, the terminal may not only distinguishably display an identifier 326 or 336 of 'MBC', which is the broadcast provider providing the currently displayed broadcast program, on the bar 324 or matrix 334, but also together display a broadcast program title 328 or 338 as broadcast information regarding the currently displayed broadcast program.

Figure 3B:
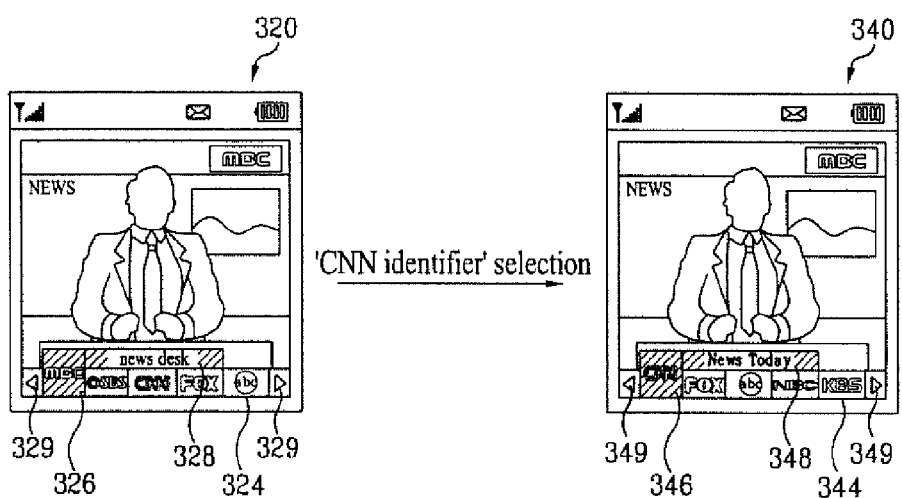
FIG. 3B is a state diagram illustrating a selection of a specific identifier from the identifiers displayed in FIG. 3A.

FIG. 3B illustrates a selection of a specific identifier from the identifiers displayed in FIG. 3A. In the case where a 'CNN identifier' is selected from the displayed identifiers in the aforementioned state 320, the terminal may not only display a 'CNN identifier' 346, but also together display a title 348 of a broadcast program which is currently provided from 'CNN' as a broadcast provider (340).

Further, as the 'CNN identifier' 346 is moved to the head of a bar 344, identifiers subsequent to the 'CNN identifier' 346 are displayed in order on the bar 344. On the other hand, the 'CNN identifier' 346 may be distinguishably displayed at its selected position, not moved to the head of the bar 344.

At this time, although not shown in FIG. 3B, the terminal may display broadcast information regarding the currently displayed broadcast program, briefly, a title or logo image, on a portion of the screen.

Figure 3C:
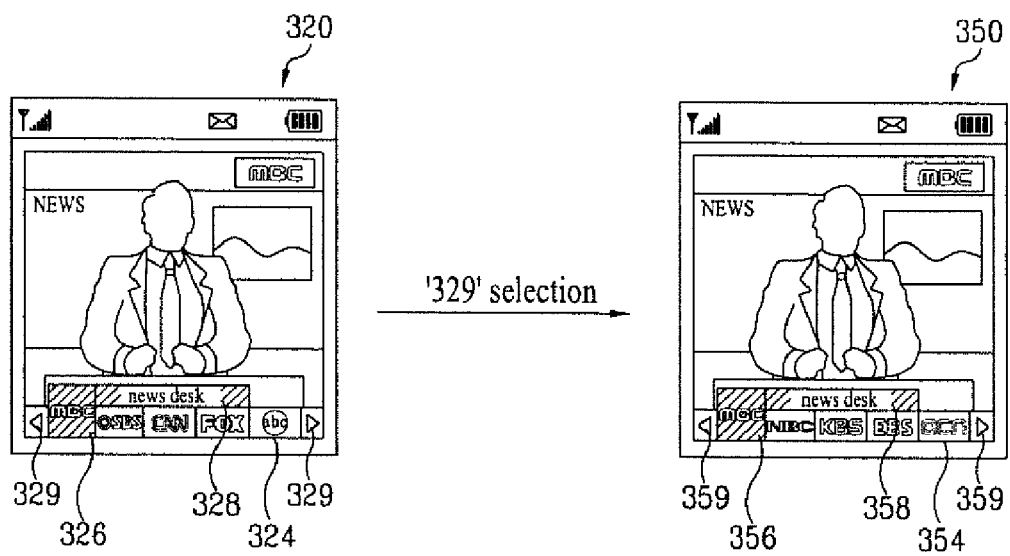
FIG. 3C is a state diagram illustrating a process of displaying identifiers while moving them in the terminal according to an embodiment of the present invention.

FIG. 3C illustrates a process of displaying identifiers while moving them. The terminal displays the bar 324 composed of a plurality of identifiers including the 'MBC identifier' at the bottom of the screen at the same time as displaying the broadcast program provided from the 'MBC'. At this time, as the move keys 329 provided at both ends of the bar 324 are activated, the 'MBC identifier', and identifiers subsequent to the identifiers displayed in the state 320 are displayed on a bar 354 (350).

Even though there is a change in the identifiers constituting the bars 324 and 354 due to the activation of the move keys 329, the terminal displays the 'MBC identifier' 326 or 356 of the 'MBC' providing the currently displayed broadcast program at the head of each of the bars 324 and 354. Further, the terminal displays the title 328 or 358 of the currently outputted broadcast program next to the 'MBC identifier' 326 or 356.

Further, although not shown in FIG. 3C, the identifiers on the bar 324 or 354 may be displayed while being slidably moved at a predetermined speed in a predetermined direction or while being moved a predetermined number of units in the predetermined direction.

Figure 3D:
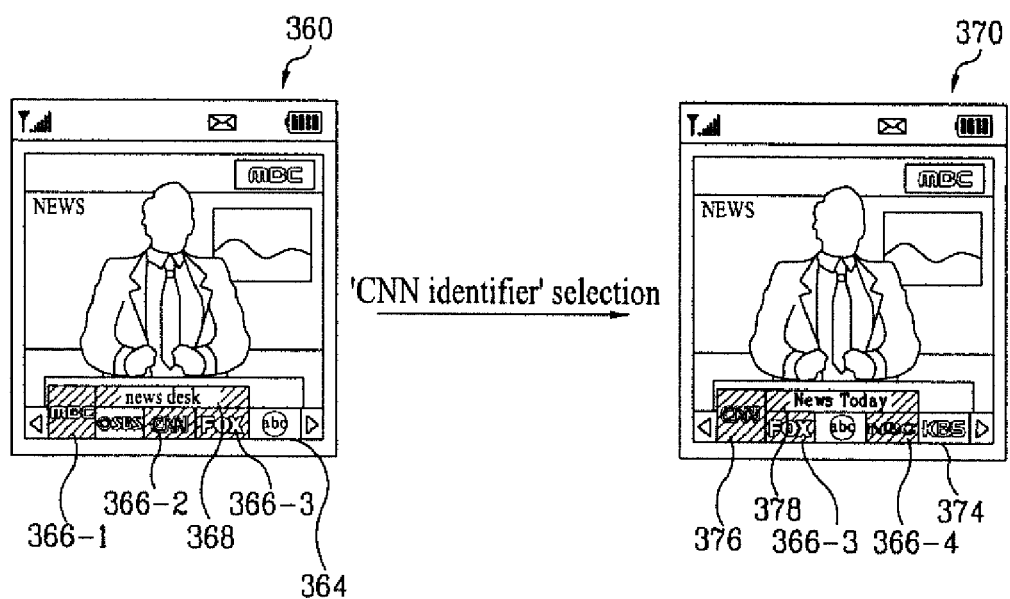
FIG. 3D is a state diagram illustrating movement among specific identifiers selected based on predetermined criteria in the terminal according to an embodiment of the present invention.

FIG. 3D illustrates movement among specific identifiers selected based on criteria. Here, the criteria may include at least one of a preference, an audience rating, the content type of a broadcast program, and a user designation/non-designation with respect to at least one of a broadcast provider, a broadcast channel allocated to a broadcast provider, and a broadcast program provided over a specific broadcast channel. The preference is based on the number of accesses to each broadcast provider, broadcast channel, or broadcast program using the terminal.

The terminal distinguishably displays an 'MBC identifier' 366-1, a 'CNN identifier' 366-2 and a 'FOX identifier' 366-3 preselected according to the predetermined criteria, among a plurality of identifiers displayed on a bar 364 (360).

If the 'CNN identifier' 366-2 is selected, then the terminal not only moves a 'CNN identifier' 376 to the head of a bar 374 and displays it, but also displays broadcast information regarding 'CNN' which is a broadcast provider indicated by the 'CNN identifier' 376, particularly, a title 378 of a currently provided broadcast program (370).

The CNN identifier' 376, the 'FOX identifier' 366-3 and an 'NBC identifier' 366-4 preselected according to the criteria are displayed on the bar 374 (370). Also, the terminal may support a movement among specific identifiers preselected according to the criteria in response to a input signal.

Figure 4A:
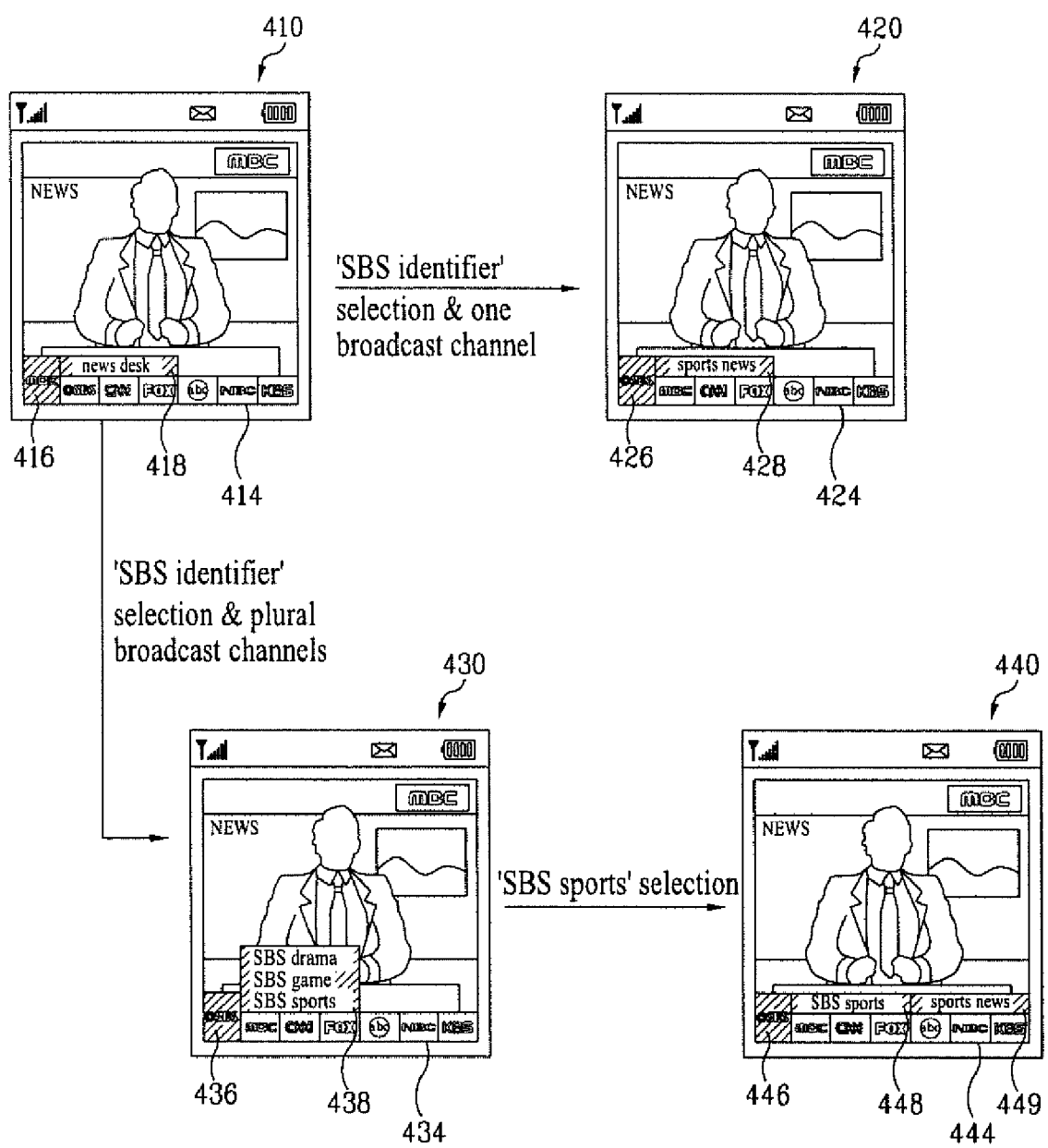
FIG. 4A is a state diagram illustrating a process of displaying broadcast information regarding a specific broadcast provider in the terminal according to a first embodiment of the present invention.

A process of displaying broadcast information regarding a specific broadcast provider will hereinafter be described in detail with reference to FIGS. 4A to 4C. FIG. 4A illustrates a process of displaying broadcast information regarding a specific broadcast provider according to the number of broadcast channels allocated to the specific broadcast provider.

The terminal displays a bar 414 composed of a plurality of identifiers at the bottom of the screen while displaying a broadcast program provided from 'MBC' (410). An identifier of 'MBC' will be referred to as an 'MBC identifier'. The 'MBC identifier' 416 is located at the head of the bar 414, and a title 418 of the broadcast program is displayed next to the 'MBC identifier' 416.

An operation will be described when the 'SBS identifier' is selected from the displayed identifiers according to the number of broadcast channels allocated to a broadcast provider 'SBS' indicated by the 'SBS identifier'.

When only one broadcast channel is assigned to 'SBS', the terminal moves an 'SBS identifier' 426 to the head of a bar 424 and displays it, and displays a title 428 of a broadcast program currently provided from 'SBS' (420).

When the number of assigned broadcast channels is more than one, the terminal moves the 'SBS identifier' 436 to the head of a bar 434 and displays it, and displays a list 438 of all the broadcast channels allocated to 'SBS' (430).

If 'SBS sports' is selected from the displayed broadcast channel list 438, then the terminal together displays 'SBS sports' 448 which is the selected broadcast channel, and a title 449 of a broadcast program currently provided over the 'SBS sports' (440).

Figure 4B:
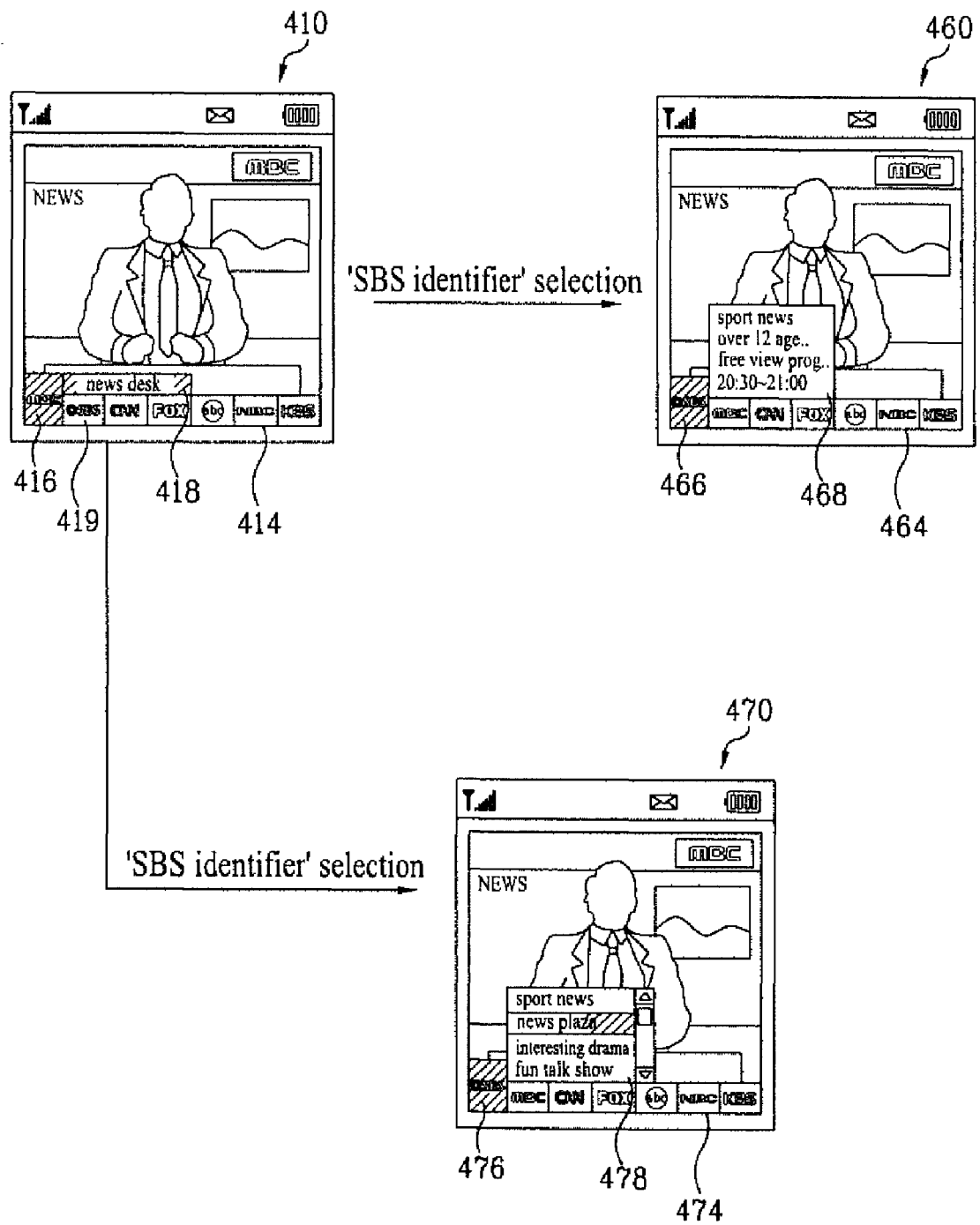
FIG. 4B is a state diagram illustrating a process of displaying the broadcast information regarding the specific broadcast provider in the terminal according to a second embodiment of the present invention.

FIG. 4B illustrates a process of displaying various broadcast information regarding a specific broadcast provider. If the 'SBS identifier' is selected as in state 410, the terminal moves the 'SBS identifier' 466 to the head of a bar 464 and displays it, and displays a broadcast program title, viewable age information, pay/free view information, broadcast synopsis information, content type, broadcast time information, etc, as broadcast information 468 regarding 'SBS' (460).

Alternatively, if the 'SBS identifier' is selected in state 410, the terminal may move an 'SBS identifier' 476 to the head of a bar 474 and display it distinguishably, and display broadcast program schedule information of 'SBS' as broadcast information 478 regarding 'SBS' (470).

Figure 4C:
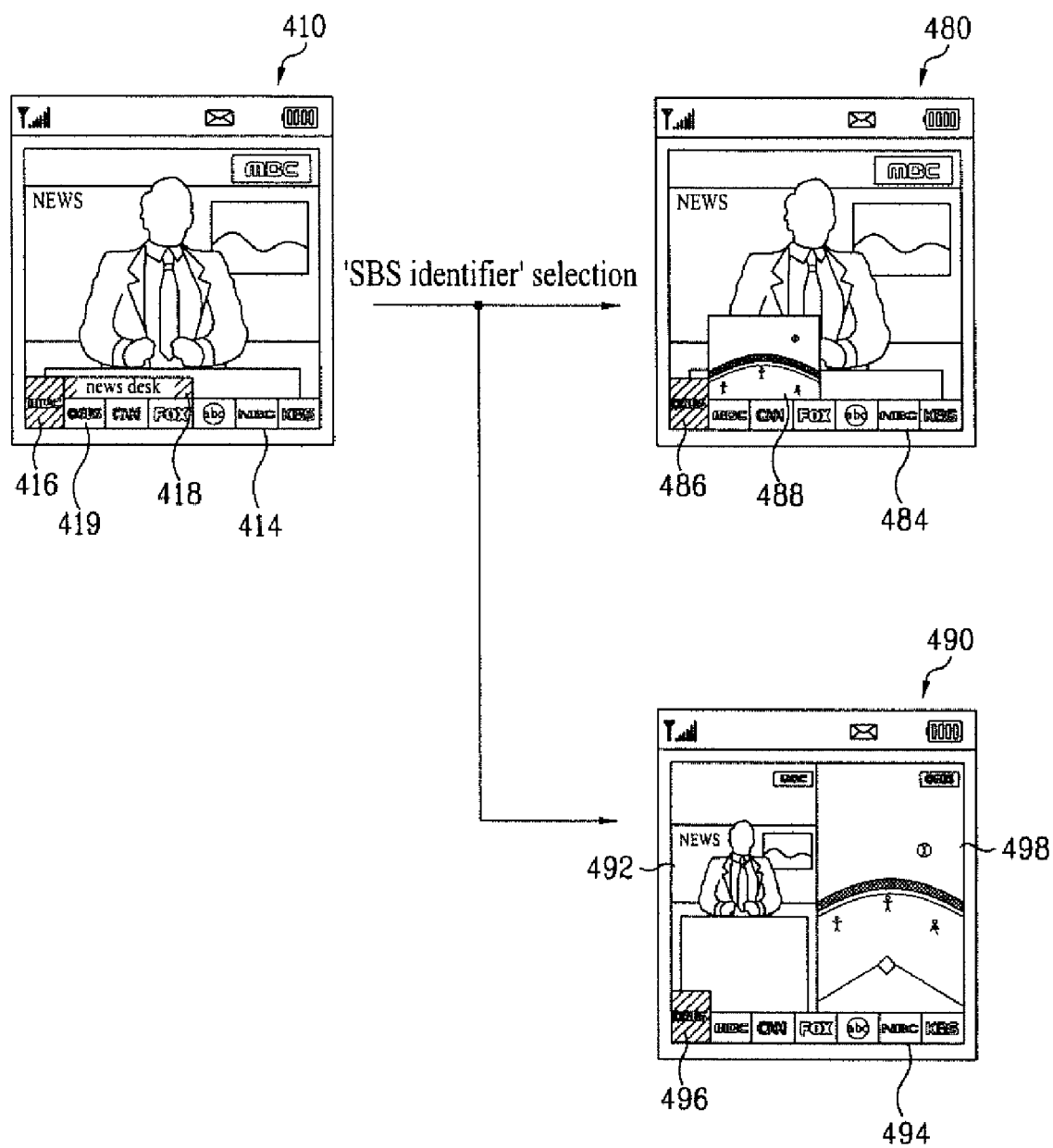
FIG. 4C is a state diagram illustrating the process of displaying the broadcast information regarding the specific broadcast provider in the terminal according a third embodiment of to the present invention.

FIG. 4C illustrates a process of providing a broadcast program itself as broadcast information regarding a specific broadcast provider.

If the 'SBS identifier' is selected from state 410, the terminal not only moves an 'SBS identifier' 486 to the head of a bar 484 and displays it, but also displays the broadcast program currently provided from 'SBS' next to the 'SBS identifier' 486 (480).

Alternatively, if the 'SBS identifier' is selected from state 410, the terminal may not only move an 'SBS identifier' 496 to the head of a bar 494 and display it, but also displays the currently selected broadcast program and a broadcast program currently provided from 'SBS' (490).

For example, the terminal may partition the screen into a plurality of areas, and display the currently selected broadcast program in one of the areas (492) and the broadcast program currently provided from 'SBS' in another one of the areas, respectively (498).

Here, the terminal may display only video data of the broadcast program currently provided from 'SBS' on the screen, or provide audio data corresponding to the video data along with the video data.

A process of displaying a broadcast program from a broadcast provider selected using an identifier in the terminal according to an embodiment of the present invention will be described in detail with reference to FIGS. 5A and 5B.

Figure 5A:
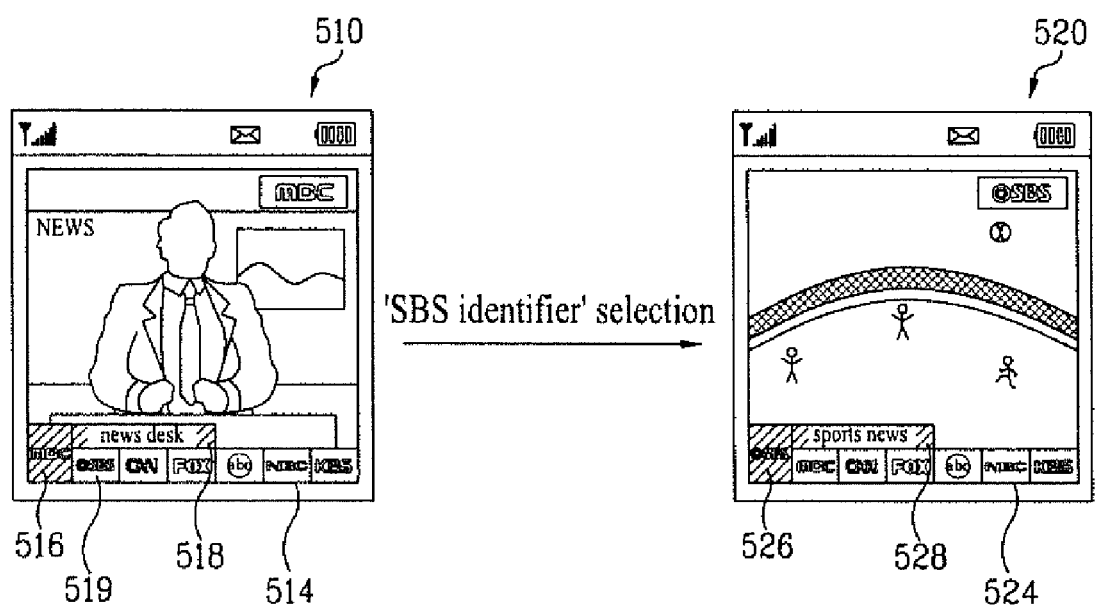
FIG. 5A is a state diagram illustrating a process of outputting a broadcast program from a broadcast provider selected using an identifier in the terminal according a first embodiment of to the present invention.

FIG. 5A illustrates of the process of displaying the broadcast program from the broadcast provider selected using the identifier in the terminal. When the 'SBS identifier' is selected while a broadcast program provided from 'MBC' is displayed (510), then the terminal stops displaying the broadcast program provided from 'MBC' and displays a broadcast program provided from 'SBS' indicated by the selected 'SBS identifier' (520).

The terminal may display the 'SBS identifier' 526 at the head of a bar 524 provided at the bottom of the screen, and display a title 528 of the broadcast program displayed in state 520.

Figure 5B:
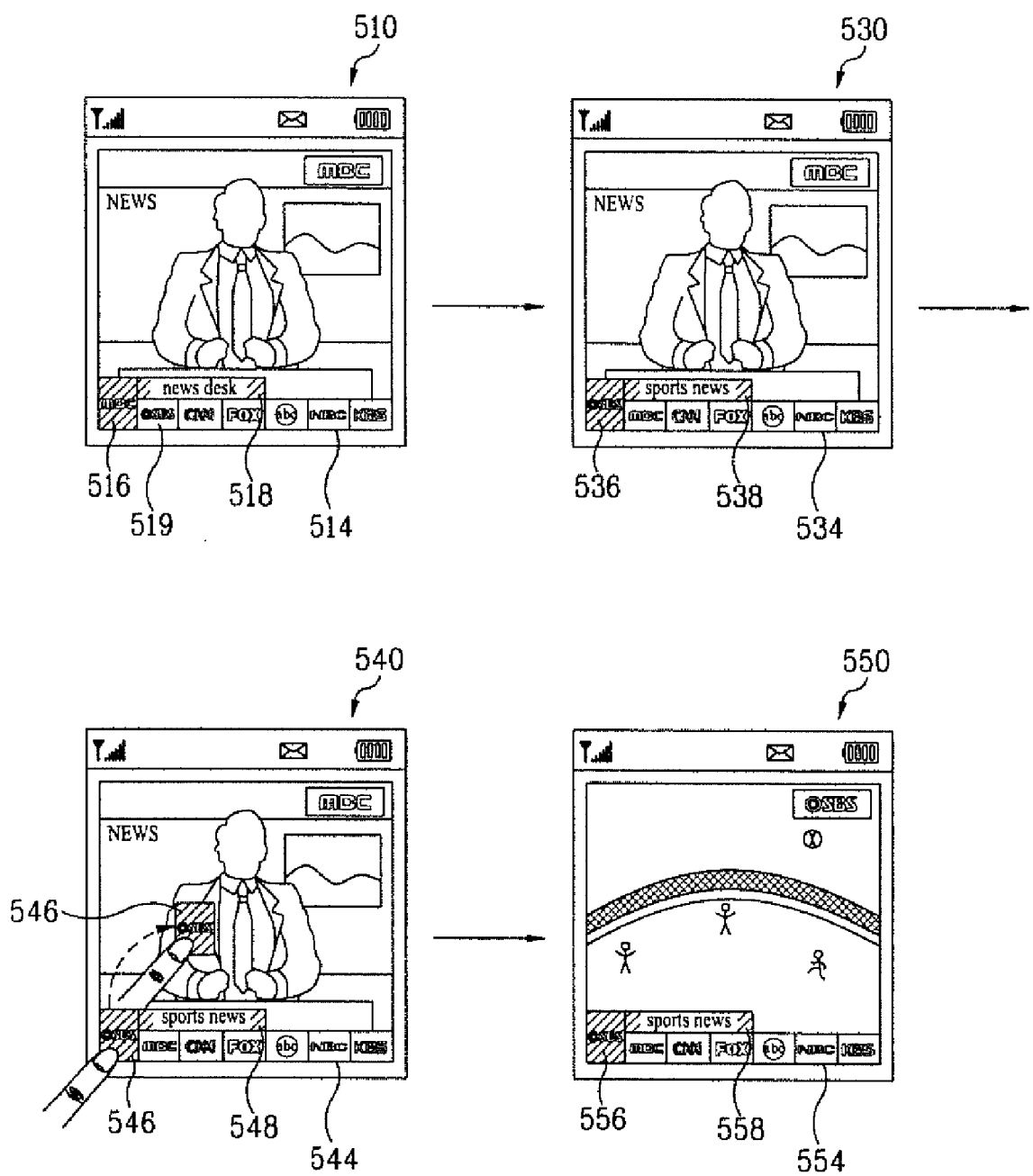
FIG. 5B is a state diagram illustrating the process of outputting the broadcast program from the broadcast provider selected using the identifier in the terminal according to a second embodiment of the present invention.

FIG. 5B illustrates a process of displaying the broadcast program from the broadcast provider selected using the identifier in the terminal. In this example, the terminal is assumed to have a touch screen.

When the 'SBS identifier' 519 is selected while a broadcast program provided from 'MBC' is displayed (510), then the terminal displays a title 538 of a broadcast program currently provided from 'SBS' at the same time as displaying an 'SBS identifier' 536 (530).

As the user moves an 'SBS identifier' 546 to a desired position on the screen by touching it (540), the terminal stops displaying the broadcast program provided from 'MBC', and receives and displays the broadcast program provided from 'SBS' (550).

As apparent from the above description, the following aspects may be realized.

First, one or more identifiers of one or more selectable broadcast providers enabling the user to identify the providers can be displayed while a broadcast program provided from one broadcast provider is displayed.

Second, various broadcast information regarding a broadcast provider selected using one or more identifiers can be displayed while a broadcast program provided from one broadcast provider is displayed.

Third, as any one of the displayed identifiers is selected, a currently displayed broadcast program can be stopped and a broadcast program provided from the selected broadcast provider indicated by the selected identifier can be displayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for providing a program list in a mobile terminal operable within a wireless communication system, the method comprising:

receiving data including media content for display on a touch sensitive display of the mobile terminal;

displaying the received media content on a first region of the touch sensitive display of the mobile terminal; and displaying a program list on a bar in a second region of the touch sensitive display in response to user interaction simultaneously while displaying the received media content on the first region of the touch sensitive display, such that the second region partially overlaps the first region and a substantial portion of the first region remains viewable by a user, wherein the program list comprises at least provider logos that identify various media providers available for selection by the user or channel logos that identify various broadcast channels available for selection by the user, wherein, if a first logo of the at least provider logos or channel logos is selected, the first logo is conspicuously identified on the bar and is moved to a predetermined position of the bar, and first information related to the first logo is displayed in the second region, wherein, if the conspicuously identified first logo is dragged and dropped to the first region, displaying of the received media content is stopped, and media content associated with the first logo is displayed on the first region, wherein, if a second logo of the at least provider logos or channel logos is selected, the second logo is conspicuously identified on the bar and is moved to the predetermined position on the bar, second information related to the second logo is displayed in the second region, and the first logo is no longer conspicuously identified and is moved next to the predetermined position, and wherein the first information or the second information includes at least a broadcast program title, viewable age information, pay free view information, broadcast synopsis information, content type, broadcast highlight information or broadcast time information.

2. The method according to claim 1, wherein at least one of the provider logos or the channel logos individually comprise either a graphical icon or an image.

3. The method according to claim 1, wherein one of the various media providers comprises a plurality of channels available for selection.

4. The method according to claim 3, further comprising:
displaying a channel logo for each of the plurality of channels.

5. The method according to claim 1, further comprising:
displaying at least one of the provider logos or the channel logos according to predetermined criteria.

6. The method according to claim 5, wherein the criteria is one of a particular order according to at least audience rating, user preference according to a predetermined indication of desired channels, or a user designation which identifies a subset of available channels.

7. The method according to claim 1, further comprising:
highlighting at least a provider logo or a channel logo of one or more of the media providers and broadcast channels based upon a media content type.

8. The method according to claim 1, further comprising:
displaying the program list as a two-dimensional array.

9. The method according to claim 1, further comprising:
displaying the program list as a scrollable list.

10. The method according to claim 1, further comprising:
receiving at least the provider logos or the channel logos from a broadcast channel, a data broadcast channel, or a wireless communication; and
storing at least one provider logo or channel logo on a storage medium of the mobile terminal.

11. The method according to claim 1, further comprising:
receiving user input which identifies at least one media provider or broadcast channel of the program list; and
displaying additional information associated with the identified at least one media provider or broadcast channel.

12. The method according to claim 11, further comprising:
simultaneously displaying the additional information as an overlay to the displayed received media content.

13. The method according to claim 11, wherein if the additional information comprises audio content, the method further comprises:
terminating output of audio associated with the received media content; and
outputting the audio content.

14. The method according to claim 1, further comprising:
receiving user input which identifies one of the broadcast channels of the program list, wherein the received media content is associated with the identified one of the broadcast channels.

15. A mobile terminal, comprising:
a receiver for receiving program data from a wireless transmitting entity;
an input component permitting user input;
a touch sensitive display for displaying the received program data on a first region of the touch sensitive display; and
a controller for controlling the touch sensitive display to display a program list on a bar in a second region of the touch sensitive display simultaneously with displaying the received program data on the first region of the touch sensitive display, wherein the program list comprises at least provider logos that identify various providers available for selection or channel logos that identify various channels available for selection, wherein the second region partially overlaps the first region such that a substantial portion of the first region remains viewable by a user, wherein, if a first logo of the at least provider logos or channel logos is selected, the controller controls the first logo to be conspicuously identified on the bar and to be moved to a predetermined position of the bar, and controls the touch sensitive display to display first information related to the first logo in the second region, wherein, if the conspicuously identified first logo is dragged and dropped to the first region, the controller controls the touch sensitive display to stop the display of the received program data, and to display media content associated with the first logo on the first region, wherein, if a second logo of the at least provider logos or channel logos is selected, the controller controls the second logo to be conspicuously identified on the bar and to be moved to the predetermined position on the bar, controls the touch sensitive display to display second information related to the second logo in the second region, and controls the first logo to be no longer conspicuously identified and to be moved next to the predetermined position, and wherein the first information or the second information includes at least a broadcast program title, viewable age information, pay free view information, broadcast synopsis information, content type, broadcast highlight information or broadcast time information.

16. The mobile terminal according to claim 15, wherein at least one of the provider logos and the channel logos individually comprise either a graphic or an image.

17. The mobile terminal according to claim 15, wherein the touch sensitive display is further configured to highlight at least a provider logo or a channel logo of one or more of the providers and channels based upon program content type.

18. The mobile terminal according to claim 15, wherein the touch sensitive display is further configured to display the program list as a scrollable list.

19. The mobile terminal according to claim 15, wherein:
the receiver is further configured to receive at least the provider logos or the channel logos from a broadcast channel, a data broadcast channel, or a wireless communication; and
the mobile terminal further comprises a storage unit for storing at least the provider logos or the channel logos.

20. The mobile terminal according to claim 15, wherein:
the input component is further configured to receive user input which identifies a provider or channel of the program list; and
the touch sensitive display is further configured to display additional information associated with the identified provider or channel.

21. The mobile terminal according to claim 20, wherein the touch sensitive display is further configured to simultaneously display the additional information as an overlay to the displayed received program data.

22. The mobile terminal according to claim 20, further comprising an audio output unit configured to terminate output of audio associated with the displayed received program data if the additional information comprises audio, and to output the audio of the additional information.

23. The mobile terminal according to claim 15, wherein the input component is further configured to receive user input which identifies one of the channels of the program list, wherein the received program data is associated with the identified one of the channels.

24. The method of claim 1, wherein the provider logos or channel logos are received.

25. The mobile terminal of claim 15, wherein the provider logos or channel logos are received.

26. The method of claim 1, further comprising selecting at least one of the various media providers or broadcast channels to be displayed in the program list based on a predetermined criterion, wherein the predetermined criterion comprises at least an audience rating, a preference, or a user designation regarding at least one of the media providers.

* * * * *